United States Patent [19]

Songer

[11] Patent Number: 4,620,217
[45] Date of Patent: Oct. 28, 1986

[54] STANDARD TRANSMISSION AND RECORDING OF HIGH RESOLUTION TELEVISION

[75] Inventor: Jimmie D. Songer, Burleson, Tex.

[73] Assignee: High Resolution Television, Inc., Los Angeles, Calif.

[21] Appl. No.: 534,592

[22] Filed: Sep. 22, 1983

[51] Int. Cl.$^4$ .......................... H04N 5/38; H04N 9/04
[52] U.S. Cl. ...................................... 358/12; 358/141; 358/23
[58] Field of Search ................... 358/11, 12, 21 R, 23, 358/41, 50, 141, 209

[56] References Cited

FOREIGN PATENT DOCUMENTS 503555  5/1939  United Kingdom .

OTHER PUBLICATIONS

Haskell, Time–Frequency Multiplexing (TFM) of Two NTSC Color TV Signals–Simulation Results, Bell System Technical Journal, vol. 60, No. 5, May–Jun. 1981, pp. 643–660.
Powers, Compatibility Aspects of HDTV, High Definition Television Colloquium 82, Oct. 18–21, 1982, Ottawa, Canada.

*Primary Examiner*—Michael A. Masinick
*Attorney, Agent, or Firm*—Freilich, Hornbaker, Rosen & Fernandez

[57] ABSTRACT

The full potential of high resolution television by synchronized modulation of the scan lines at the camera and display unit is achieved in standard transmission through band limited channels by: separating out of the video signal from the television camera the modulation frequency as sidebands with pixel information, for example 7.16±½ MHz in the case of a color subcarrier at 3.58 MHz under the NTSC standards and pixel information modulated on sidebands in a narrow band (about ±½ MHz); converting the sidebands with pixel information down to within the color subcarrier band (in the range of 3.75 MHz to 4.2 MHz) using a heterodyne converter; and adding back to the video signal out of the camera the down-converted sidebands with pixel information before processing it through the color encoder for transmission through the bandwidth limited channel. The transmitted signal may be received and displayed by a standard television receiver or monitor, but to achieve the higher resolution which modulation of the scan line affords, the receiver, or monitor, must be modified to convert the color reference frequency to the line scan modulation frequency (synchronized with the color subcarrier) and, while using the color reference at the standard frequency for color decoding, using the modulation frequency to modulate the line scan of the color display tube at the same time the detected video signal is filtered to separate the down-converted sidebands with pixel information, convert the sidebands with pixel information back up to the modulation frequency using a heterodyne converter, and add the up-converted sidebands with pixel information back into the detected video signal for processing in the receiver or monitor modified to modulate the scan lines for display.

10 Claims, 5 Drawing Figures

STANDARD TRANSMISSION AND RECORDING OF HIGH RESOLUTION TELEVISION

BACKGROUND OF THE INVENTION

This invention relates to high resolution television as disclosed in U.S. application Ser. No. 06/515,220 filed July 19, 1983, a continuation-in-part of application Ser. No. 06/364,884 filed Apr. 2, 1982, and now abandoned and more particularly to an improvement in technique for achieving high resolution television within a bandwidth limited transmission channel.

In the United States, the National Television Systems Committee (NTSC) adopted certain standards for color television transmission using a technique that so encodes color information in the composite video signal that the color information will not detract from the ability of a monochrome receiver to display the image in black and white, while color receivers can use the encoded color information for display of the image in full color. The NTSC system, based on the utilization of three color primaries (red, green and blue) has been adopted by other countries for use within their prescribed standard for monochrome transmission to black-and-white television receivers. Consequently, it should be understood that this invention to be described, with reference to NTSC standards, is applicable by analogy to other systems designed to different standards, such as PAL and SECAM.

In accordance with the invention disclosed in the aforesaid application, vertical resolution is increased for standard television by modulating the vertical scan axis of a television camera such that each active scanning line traverses an undulatory path rather than a straight line, i.e., oscillates about the normal horizontal scan line. The amplitude of the modulation is preferably sufficient for interlaced lines of a frame to intrude the area of adjacent lines, which is modulation with an amplitude equal to plus and minus one half line spacing of the interlaced fields above and below the center of the normal scan line. The video signal thus produced by actually scanning areas above and below the normal scan lines is then transmitted just as for the normal scanning lines, which preferably would be within a wider bandwidth of about 8 MHz or more, but can be within the vestigial bandwidth limit of about 4 MHz for NTSC color transmission through a 6 MHz channel.

At a monitor or television receiver, a local oscillator modulates the vertical scan axis of each line to be at the same frequency, phase and relative amplitude as the modulation employed in the television camera in order to synchronously reproduce each line of a frame. The local oscillator may be synchronized with the television camera by information contained in the received video signal. For example, in NTSC color transmission, a gated burst of the color subcarrier is transmitted during horizontal blanking periods for use in regenerating the color subcarrier as a reference in the monitor or television receiver, hereinafter referred to generally as the display unit. Consequently, a convenient modulation frequency is the fundamental or preferably some even harmonic of the chrominance subcarrier frequency (3.579545 MHz in the NTSC system). If the modulation in the television camera and the display unit are synchronized, the display unit will reproduce the frame in the same manner as it was scanned in the camera, which is with increased vertical resolution.

The second harmonic (7.15909 MHz) of the color subcarrier frequency, or other even harmonic, such as some multiple of the second harmonic of the color subcarrier frequency, is preferred over the fundamental (3.579545 MHz) because, at the standard 15.734 kHz line scan frequency, each line will have substantially a whole number of modulation cycles, such as 455 for the second harmonic, rather than a fractional number of modulations, namely 227.5 for the fundamental, thus making it easier to maintain the same modulation phase from line to line in a frame.

Modulation of the scan line with a higher frequency than the fundamental chrominance subcarrier will increase the bandwidth requirements of the color subcarrier side bands, usually between 3.75 MHz and 4.2 MHz. For standard transmission through a 6 MHz channel, such as a broadcast channel allocated by the Federal Communications Commission, the color subcarrier sidebands must be limited by a filter. While vertical resolution is increased even with a limited transmission channel (from significantly less than 485 active lines in a frame of 525 scan lines to significantly more, such as about the equivalent of 600 scan lines), the full potential of increasing vertical resolution to the equivalent of 800 scan lines per frame, or more, will not be realized because of the color subcarrier sideband filter. While it may be possible to omit the filter in some special transmission networks, such as private cable networks, it would be desirable to achieve the full potential of high resolution television for standard transmission.

SUMMARY OF THE INVENTION

In accordance with the present invention, the full potential of high resolution television by modulation of the scan lines is achieved in standard transmission through band limited channels by: separating out of the video signal from the television camera the modulation frequency as a sideband with pixel information, but without a carrier, amplitude and phase related to the scan modulation frequency, for example 7.16 MHz in the case of a color subcarrier at 3.58 MHz under the NTSC standards. The pixel information is contained in the sidebands in a narrow band (about $\pm\frac{1}{2}$ MHz); converting the sidebands with pixel information down to within the color-subcarrier band (in the range of 3.75, to 4.2 MHz) using a heterodyne converter; and adding back to the video signal out of the camera the down-converted side-bands with pixel information before processing it through the color encoder for transmission through the bandwidth limited channel. The transmitted signal may be received and displayed by a standard television receiver or monitor, but to achieve the higher resolution which modulation of the scan line affords, the receiver, or monitor, must be modified to convert the color reference frequency to the line scan modulation frequency (synchronized with the color subcarrier) and, while using the color reference at the standard frequency for color decoding, using the modulation frequency to modulate the line scan of the color display tube at the same time the detected video signal is filtered to separate the down-converted sidebands with pixel information, convert the sidebands with pixel information back up to the modulation frequency using a heterodyne converter, and add the up-converted sidebands with pixel information back into the detected video signal for processing in the receiver or monitor modified to modulate the scan lines for display.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
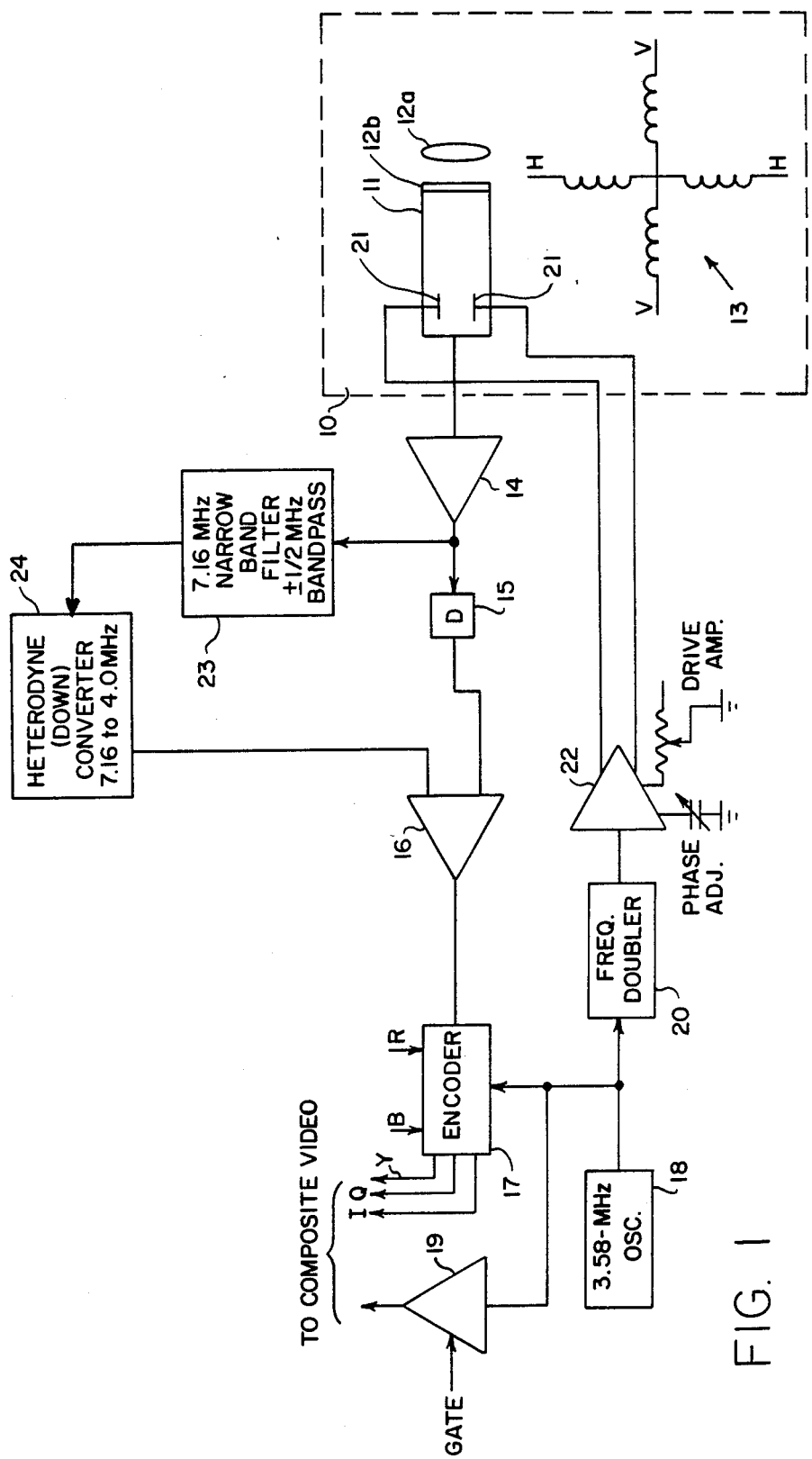
FIG. 1 illustrates schematically that part of a color television camera embodying the present invention.

Referring to the drawings, FIG. 1 illustrates schematically those portions of a color television camera necessary for an understanding of the present invention which include a camera head 10 having a pickup tube 11, lens 12a, color filter 12b, and deflection yoke 13 for vertical and horizontal deflection of the electron scanning beam. The camera head is controlled by a unit (not shown) which provides the horizontal (H) and vertical (V) drive as well as blanking pulses in the usual manner. The video signal from the pickup tube is processed through a preamplifier 14, an adjustable delay 15 and a summing amplifier 16.

The camera head 10 is shown with only one tube 11, whereas two, three, and sometimes four, pickup tubes are used in the NTSC system for color television, to scan the scene received through separate lenses and color filters that separate the red, blue, and green light. The single tube 11 with its separate lens 12a, filter 12b and deflection yoke 13 is shown being used for the green camera tube, as determined by its filter 12b. Each of the other tubes in the camera head for the other two colors is provided with its own amplifiers 14 and 16 (and its own delay between the amplifier 14 and 16) to provide the other color signals R and B, even though only the signal from the green camera tube is to be processed in accordance with this invention. It is sufficient to practice the invention with only the green color signal because the green has the most luminance energy (59%). The delay circuit in the red and blue camera tube paths assure that the red, green and blue signal will be synchronized at the encoder 17.

Figure 2:
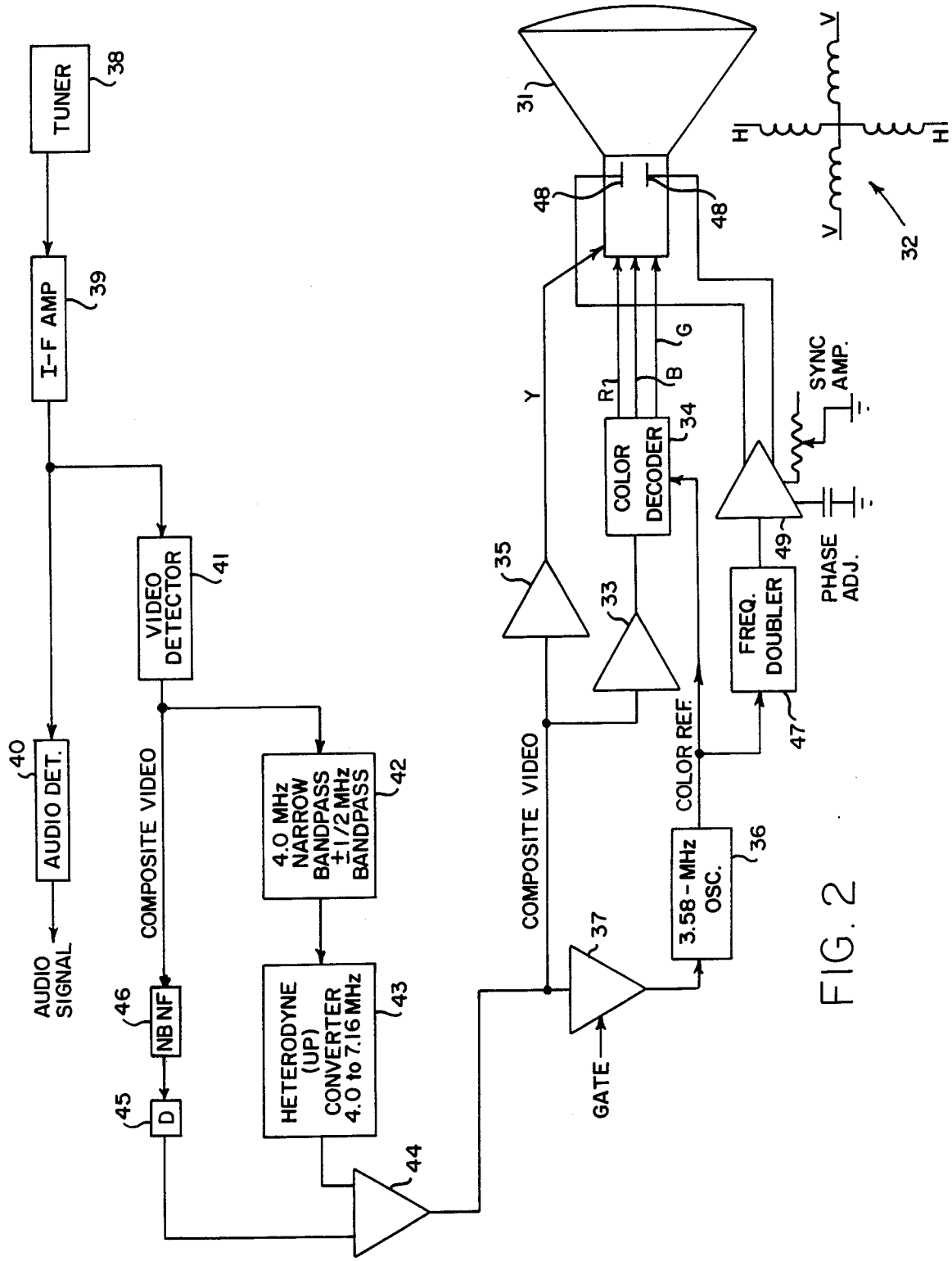
FIG. 2 illustrates schematically that part of a color television receiver embodying the present invention.

The color encoder 17 derives the luminance signal Y from the weighted sum of the color signals R-Y, B-Y and G-Y, and derives the quadrature chrominance signals I and Q using a color carrier from a 3.58 MHz oscillator 18. This color carrier is gated through an amplifier 19 during horizontal blanking periods and added to the composite video for synchronizing a color reference signal from a local 3.58 MHz oscillator in the receiver (FIG. 2). The composite video signal is linked to the television transmitter, recorder and/or monitor through a control unit where the audio signal is combined.

Figure 3:
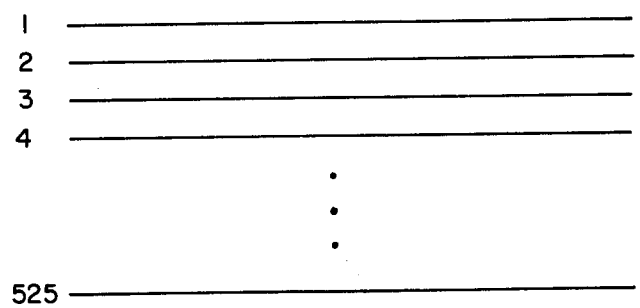
FIG. 3 illustrates schematically the straight parallel scan lines of conventional television scanning and display.
Figure 4:
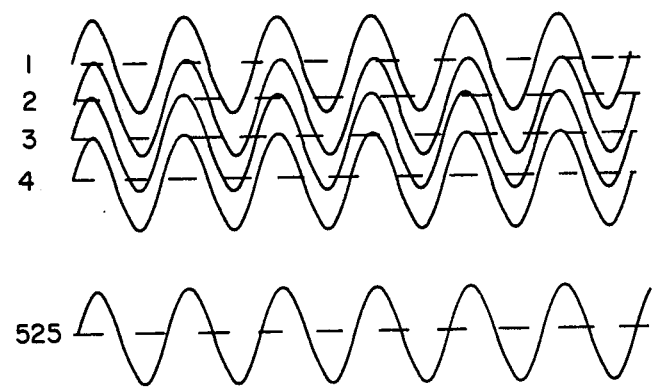
FIG. 4 illustrates schematically the undulating parallel scan lines of the present invention which increases vertical resolution.

The color subcarrier is increased from 3.58 MHz to 7.16 MHz by a frequency doubler 20, and applied to vertical deflection plates 21 in the camera tube (or vertical deflection coils outside the camera tube) through an amplifier 22 for vertical modulation of the horizontal line scan as shown in FIG. 3 without the modulation, and again in FIG. 4 with the modulation. The phase and amplitude of this vertical modulation may be adjusted at the amplifier 22. Similar amplifiers would couple the 7.16 MHz modulation signal to other camera tubes if this invention were to be practiced in all three color channels for optimum high resolution, although, as noted above, since the green signal has the largest component of the derived luminance signal, Y, it is possible to practice the invention of the aforesaid patent application with only the scan of the green color tube modulated.

While reference is made specifically to 7.16 MHz, the modulation frequency may be any even harmonic of the color subcarrier, which is actually at precisely 3.579545 MHz. An even harmonic is preferred so that there will be a number of whole cycles of modulation during each of the lines scanned at a standard 15.734 kHz line frequency, as noted hereinbefore. In that way, the modulation cycles will be substantially in phase from line to line. And using a harmonic of the color subcarrier facilitates synchronizing the receiver or monitor since bursts of the color subcarrier are transmitted during line blanking periods in order to synchronize the color reference oscillator in the receiver or monitor. However, any modulation frequency may be used, provided there is some way to synchronize the local oscillator at the receiver or monitor.

As the camera tube scans at a modulated 7.16 MHz rate, the signal out of the tube will have pixel information generated at the linear scan rate of the 7.16 MHz vertical scan modulation. As a consequence, there are generated sidebands with pixel information, but without a carrier, amplitude and phase related to the 7.16 MHz. The bandwidth of this pixel information is very narrow ($\pm \frac{1}{2}$ MHz).

Figure 5:
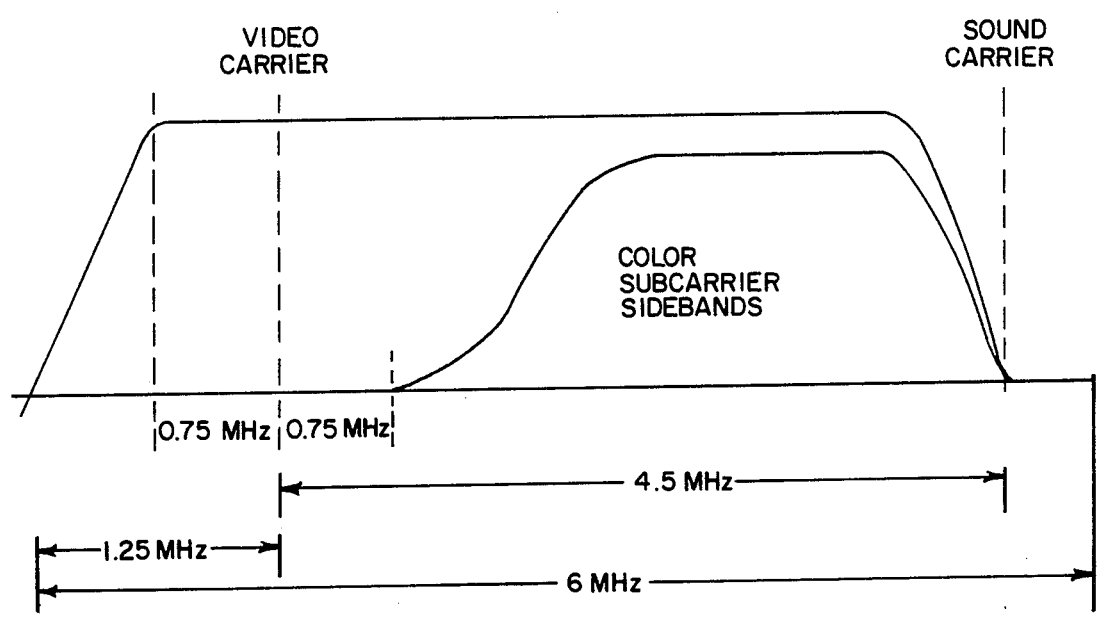
FIG. 5 illustrates the location of color television signals in a standard 6 MHz channel.

A narrow band filter 23 centered at 7.16 MHz to pass $\pm \frac{1}{2}$ MHz of bandwidth strips this sideband information from the camera output signal out of the preamplifier 14, and passes it to a heterodyne converter 24 which converts the sideband pixel information to a lower frequency within the color subcarrier sideband shown in FIG. 5 between 3.75 MHz and 4.2 MHz, preferably at 4.1 MHz. The down-converted signal is then added in the amplifier 16 to the color signal from the preamplifier 14. The adjustable delay 15 compensates for the delay time through the filter 23 and converter 24.

FIG. 2 illustrates schematically only those portions of a display unit which are necessary for an understanding of the invention. Basically, the display unit (shown as a television receiver, though it could be a monitor) is comprised of a picture tube 31 and deflection yoke 32. The deflection yoke receives the normal horizontal (H) and vertical (V) deflection signals to scan 525 lines in two interlaced fields of 262.5 lines. The picture tube also receives the normal line and frame blanking pulses during beam retrace periods. The composite color video is passed through a color bandpass amplifier 33 and color decoder 34 for demodulating the encoded color signals I and Q into the basic color signals R-Y, B-Y and G-Y. The luminance signal (Y) is passed by a video amplifier 35 to the picture tube for control of brightness.

For the color demodulation in the display unit, a color reference oscillator 36 tuned to precisely 3,579,545 Hz is synchronized by the gated color subcarrier bursts received via a gated amplifier 37 during each horizontal sync pulse, i.e., during each line blanking period. In that way, color demodulation (decoding) is synchronized with the color modulation (encoding) of the transmitted signal.

In a television receiver, or monitor, there is a tuner 38 which receives a television program signal (video and audio) modulated on a carrier from an antenna, video cassette recorder (VCR), or cable converter, or some other source in the case of a monitor, such as cable directly from the television camera via a transmission unit. The I-F (intermediate frequency) signal out of the tuner is passed through an I-F amplifier 39 to an audio detector 40 and a video detector 41. The audio signal detected is passed through power amplifiers to speakers (not shown). The composite video from the detector 41 is normally applied directly to the amplifiers 33 and 35, but instead it is applied to a 4.0 MHz narrow bandpass filter 42 and heterodyne converter 43 in accordance with this invention. The filter 42 strips the vertical modulated sideband information (sidebands and pixel information) at 4.0 MHz±½ MHz from the composite video signal and the heterodyne converter 43 converts the signal at 4.0±½ MHz to 7.16±½ MHz. The up-converted signal at the frequency of 7.16 MHz is then added to the composite video signal through an amplifier 44, thus fully restoring the sidebands with pixel information to the composite video. An adjustable video delay element 45 is used to maintain the proper phase relationship between the signals being added. A narrow band notch filter 46, matched with the narrow bandpass filter 42 and properly aligned will subtract the converted sideband information from the composite video signal, and leave a "hole" for the up-converted sideband signal to be inserted through the summing amplifier 44. The composite video having the sidebands with the pixel information fully restored is then demodulated in the color decoder 34.

For the high resolution television intended by the line scan modulation of the camera, the display tube must also be modulated in synchronism with the sideband information. Otherwise, the components 43–45 would not be required, and a standard television picture display would be produced with only nominal enhancement of the picture resolution, if any. Consequently, the color reference from the synchronized 3.58 MHz oscillator is converted to the modulation frequency (7.16 MHz) of the camera by a frequency doubler 47, the output of which drives vertical deflection plates 48 through an amplifier 49. The line scan modulation can be adjusted in phase and synchronous amplitude at the amplifier 49.

What has been described is a color television system comprised of a standard NTSC camera and display unit. Only so much of each has been shown as is necessary to understand and practice the invention. In that regard, it should be understood that the NTSC standard is used by way of example, and not limitation. The invention described may be adapted to PAL and SECAM standard systems as well as other standard systems, as noted hereinbefore. It can also be adapted to black-and-white single channel systems, provided the equivalent of the color carrier is processed in the same way, but without color encoding and decoding.

The essence of the high resolution television technique described in the aforesaid application is to use the output of a stable oscillator, such as the color subcarrier oscillator 18, at the camera to vertically modulate (deflect) its 525 scan lines by ±½ line space through a driver amplifier 22 using electrostatic deflection plates 21 in the camera tube 11, or equivalent auxiliary deflection coils located between the yoke 13 and tube 11. The normal (unmodulated) scan follows a pattern shown in FIG. 3. In actuality, the lines are sloped downwardly from left to right as the vertical deflection signal continues to move the beam from the top to the bottom for one field of 262.5 lines. The return (while the line is blanked) is at a much greater rate than the scan, so that what is shown in FIG. 3 more nearly represents the return path for the blanked beam, but for purposes of this invention, it may be assumed that the scan lines are exactly horizontal (as indeed they appear to the viewer). The modulation superimposed on adjacent lines from two fields of a frame is then shown in FIG. 4. Because the modulated scan lines are not straight lines, each modulated line includes more pixel information. In other words, 525 lines cover more area in the entire scene to increase the vertical resolution by about two or more times, depending upon the amplitude of modulation, and the beam spot size.

The bandwidth of the video signal transmitted to the display unit is another factor, but in accordance with this invention, the bandwidth requirement is reduced to the color-subcarrier sideband by converting the sidebands with pixel information at the modulation frequency (7.16±½ MHz down to a frequency well within the color subcarrier side-band, such as 4.1 MHz, or some other frequency in the range of about 3.75 MHz to 4.2 MHz. Then at the receiver, the sidebands with pixel information are up-converted to the modulation frequency for high resolution television display using a synchronized color reference signal at the modulation frequency for both color decoding and modulation of the vertical deflection of the horizontal scan.

As noted in the aforesaid application, a significant benefit of this modulation technique is that the line scan, no longer linear, cannot be parallel to lines in the scene being televised, such as stripes in fabric. As a consequence, vertical aliasing is virtually eliminated over most of the scene. The amount of vertical aliasing eliminated depends upon the relationship of the depth of modulation of the camera tube at the scan line modulation rate. If maximum, there will be maximum elimination of vertical aliasing.

It should be noted that if a display unit is not equipped with a frequency doubler, driver and auxiliary deflection means (plates or coils), the program transmitted from a camera so equipped will be displayed with linear horizontal scan lines. In that sense, the invention is compatible with display units not adapted to display a program with increased vertical resolution.

The general technique of modulating line scan of a camera (color or black-and-white) and synchronously modulating line scan of a display unit can be practiced with other equipment and other standards, such as PAL and SECAM. The manner of synchronizing the modulation at the display unit with the camera modulation can also be varied to use any technique for transmitting from the camera a signal that may be used by the display unit for controlling the phase and frequency of a local oscillator in the display unit. In practice, the horizontal sync pulses themselves could be used to set the phase of the modulating signal from a stable oscillator at the start of each line scan in the camera. The transmitted horizontal sync signal is then detected by the display unit to similarly set the phase of the local oscillator at the start of each line scan.

In the production of a television program, a programmed digital computer may be employed to generate video signals in place of a camera, and as in the case of a camera, vertical resolution of the program may be increased by application of the same technique, which is by programming the computer to generate video signals for a modulated horizontal scan rather than a linear scan. Similarly, in the display of a television program, a programmed digital computer may be used to drive a display unit other than a cathode ray tube. Again, application of the technique of the present invention may be utilized to increase vertical resolution, provided only that the display unit is capable of displaying a modulated horizontal display line, such as in a laser display or a flat television display panel, or even a giant display panel having more vertical pixel display capability than the number of lines in the television signal format, which for NTSC television is 525 lines.

This invention provides the full benefit of high resolution television by vertically modulating the horizontal scan line without the necessity of increasing the transmission channel bandwidth. The transmission may even be through a video tape recorder and video disk playback unit. However, because vertical modulated sideband information is recorded and then played back at 4.0 MHz before it is converted up to 7.16 MHz for display, any variations in the frequency of the sideband information due to tape stretching during the recording and/or playback process will be multiplied by a factor of two in the up-converter. It is therefore recommended that a time base corrector (TBC) be provided in the playback unit with a CCD (charge coupled device) memory having a capacity for three-lines, thus providing 1.5 line capacity for storing a new line and 1.5 line capacity for correction of the previous line stored. As each new line is being stored, the previous line in memory can be read out at a faster or slower rate, depending on what is necessary to restore the nominal 63 microsecond horizontal sync pulse timing. This TBC is usually provided in television program recording and playback units, so most units can be used with the present invention. In that sense the present invention is compatible with magnetic tape recording. There is not a similar problem in laser disc recording and playback; the problem is unique with tape because of the elasticity of the tape, which may stretch as much as one quarter inch in eight inches.

Although particular embodiments of the invention have been described and illustrated herein, it is recognized that modifications and variations may readily occur to those skilled in the art. Consequently, it is intended that the claims be interpreted to cover such modifications and variations.

What is claimed is:

1. In a television system having a bandwidth limited transmission channel comprised of a camera and a display unit, a method for improving vertical resolution of a video signal produced by said camera, frame by frame, comprising the steps of modulating the vertical beam deflection of said camera while producing said video signal for each line of a frame, said modulation having a frequency higher than the upper bandwidth limit of said transmission channel for causing each line scanned to undulate about the normal straight line scan, separating out of the video signal from said camera vertical modulated sidebands with pixel information which is narrow band; converting said sidebands with pixel information down to a frequency within said bandwidth limited channel using a converter; adding back to the video signal out of the camera the down-converted sidebands with pixel information before processing it further for transmission through the bandwidth limited channel; modulating the vertical beam deflection of said display unit with the same phase and relative amplitude as the modulation of the vertical beam deflection of said camera for display of each line of a frame in the same pattern as scanned by said camera, and at the display unit detecting the video signal transmitted; separating the down-converted sidebands with pixel information from the detected video signal, converting the separated sidebands with pixel information back up to said modulation frequency used at said camera; and adding the up-converted sidebands with pixel information back into the detected video signal before processing it further for display.

2. A method defined by claim 1 wherein said video signal is transmitted to a display unit together with information for synchronizing the modulation of the vertical beam deflection in said display unit with the same effect of modulation of the vertical beam deflection in said camera on said video signal.

3. A method as defined by claim 2 wherein modulation at said camera is at a fixed frequency controlled by a stable oscillator, and modulation at said display unit is at said fixed frequency controlled by a stable oscillator, and wherein said information for synchronizing the modulation of said display unit is comprised of bursts of cycles from said stable oscillator at said camera gated to said display unit during line blanking periods of said video signal, and said display unit accepts said bursts for synchronizing the phase of said stable oscillator at said display unit.

4. A method as defined by claim 3 wherein said television system utilizes a color television camera, and said oscillator at said camera generates a carrier for color modulation, and said stable oscillator at said display unit generates a color reference for use in color decoding.

5. A method as defined in claim 4 wherein said color carrier is at 3,579,545 Hz and each frame includes 525 lines at a rate of 15,734 lines per second, including the step of deriving from said color carrier a signal at some even multiple for modulation of each line at both said camera and said display unit.

6. In a television system having a bandwidth limited transmission channel comprised of a camera for producing a video signal and a unit for display of said video signal, said camera having a means for vertical and horizontal deflection of an electron beam driven for scanning a predetermined number of horizontal lines for each video frame, and said display unit having means for vertical and horizontal deflection of an electron beam synchronized for displaying said frame, said camera having means for modulating the vertical beam deflection at a rate to produce cycles of undulation about the normal straight line scan thereby producing sidebands with pixel information at a frequency higher than the upper bandwidth limit of said transmission channel, and said display unit having means for modulating the vertical beam deflection of said display unit with the same phase and relative amplitude as the modulation of said video signal for display of each line of said frame in the same pattern as scanned by said camera, thereby displaying the sideband information, said television system further including means for separating out of the video signal from said camera said sidebands with pixel information within a narrow band; means for converting said sideband information with pixel information down to a frequency within said bandwidth limited channel using a heterodyne converter; means for adding back to the video signal out of the camera the down-converted sidebands with pixel information before processing it further for transmission through the bandwidth limited channel; and at said display unit means for detecting the video signal transmitted; means for separating the down-converted sidebands with pixel information from the detected video signal, means for converting the separated sidebands with pixel information back up to the modulation frequency used at said camera; and means for adding the up-converted sidebands with pixel information back into the detected video signal before processing it further for display.

7. Apparatus as defined in claim 6 wherein said deflection means for said camera is comprised of a stable frequency oscillator operating at a predetermined frequency driving vertical deflection means associated with said camera, and said deflection means for said display unit is comprised of a stable oscillator operating at said predetermined frequency driving vertical deflection means associated with said display unit, and including means for synchronizing the phase of said oscillator for said display unit with information transmitted by said camera with said video signal.

8. Apparatus as defined in claim 7 wherein said oscillator for said camera is comprised of an oscillator for color modulation, said oscillator for said display unit is comprised of an oscillator for color demodulation, and said information transmitted by said camera with said video signal is comprised of bursts of cycles of said camera oscillator gated during line blanking periods of each frame.

9. Apparatus as defined in claim 8 wherein each frame includes 525 lines scanned at a line rate of 15,734 lines per second, wherein said deflection means for said camera includes a frequency doubler and said oscillator for said camera operates at 3.579545 MHz, and wherein said deflection means for said display unit includes a frequency doubler, whereby each scan line in both said camera and said display unit includes 455 modulation cycles.

10. In a television system for transmitting from a color camera to a receiver through a bandwidth limited channel, said camera having three camera tubes, each with a separate one of red, green and blue filters, a method for improving vertical resolution of a video signal produced by said camera frame by frame comprising the steps of effectively modulating the vertical component of said green filtered camera tube while producing said video signal for each line of a frame, said modulation causing each line scanned by said green tube to undulate about the normal straight line scan at a frequency higher than the upper limit of said channel with an amplitude sufficient for each cycle of undulation to intrude the scan area of adjacent lines in a frame, separating out of the video signal from said camera vertical modulated sidebands with pixel information within a narrow band; converting said sidebands with pixel information down to a frequency within said bandwidth limited channel using a heterodyne converter; adding back to the video signal out of the camera the down-converted sidebands with pixel information before processing it further for transmission through the bandwidth limited channel, and modulating the vertical beam deflection of said receiver with the same phase and relative amplitude as the modulation of said green filtered video signal for display of each line of a frame in the same pattern as produced by said color camera, and at the display unit detecting the video signal transmitted; separating the down-converted sidebands with pixel information from the detected video signal, converting the separated sidebands with pixel information back up to said modulation frequency used at said camera; and adding the up-converted sidebands with pixel information back into the detected video signal before processing it further for display.

* * * * *